April 15, 1969  J. DOLLFUS ET AL  3,438,573
MIXING AND SEPARATING LIQUIDS CENTRIFUGALLY
Filed Dec. 27, 1966  Sheet 1 of 7

INVENTORS
Jacques Dollfus &
Jean Paul Miachon

BY *Bauer and Seymour*
ATTORNEYS

FIG. 4.

INVENTORS
Jacques Dollfus &
Jean Paul Miachon

ATTORNEYS

INVENTORS
Jacques Dollfus &
Jean Paul Miachon

INVENTORS
Jacques Dollfus &
Jean Paul Miachon

BY Bauer and Seymour

ATTORNEYS

INVENTORS
Jacques Dollfus &
Jean Paul Miachon

# United States Patent Office 3,438,573
Patented Apr. 15, 1969

3,438,573
MIXING AND SEPARATING LIQUIDS CENTRIFUGALLY
Jacques Dollfus, Saint-Mande, and Jean Paul Miachon, Lyon, France, assignors to La Societe des Ateliers Robatel et Mulatier, Lyon, Rhone, France
Filed Dec. 27, 1966, Ser. No. 604,679
Claims priority, application France, June 13, 1966, 65,285
Int. Cl. B04b 5/02, 11/02
U.S. Cl. 233—15                                28 Claims

ABSTRACT OF THE DISCLOSURE

Apparatus for mixing and then decanting, in a predetermined plurality of sequential stages, two normally immiscible liquids of heavier and lighter specific gravities, respectively, and comprising a drum rotatable at high speed about its longitudinal axis of symmetry. The drum contains a plurality of cylindrical sections fitting therein in end-to-end contacting relation, with their interfaces in planes normal to and spaced along the axis. The sections are open at their centers and a tube, which may be fixed, extends freely through the drum, along the axis. Pipes for feeding the two liquids separately into the apparatus and for exhausting the decanted liquids therefrom, extend in and along the aforesaid tube. Each main section consists at least of an annular mixing chamber and an adjacent annular decantation chamber, in communication. Heavier liquid is introduced into the mixing chamber of the first section at one end of the drum and there mixed with decanted lighter liquid flowing from the second end of the drum. The two mixed liquids then flow together into the decantation chamber of the first section. Decanted heavier liquid then reverses and flows to the mixing chamber of the next section from the first end, and so on, after which it is exhausted from the decantation chamber at the second end of the drum. Lighter liquid is introduced into the mixing chamber of the section at the second end of the drum and after mixing and decantation, flows to the mixing chamber of the next section toward the first end of the drum. This flow is interspersed by mixing and decantation, repeated for the predetermined number of stages. Following final decantation the lighter liquid is exhausted from the first end. Generally, therefore, the two liquids flow in respective opposite directions along the axis of rotation.

The present invention relates to an apparatus for intermingling and subsequent decantation, in a plurality of stages, of two normally immiscible liquids, and is an improvement over the apparatus disclosed in the copending application of Jacques Dollfus, Ser. No. 566,911, filed July 21, 1966.

The aforesaid application discloses an apparatus and method for the intermingling of two normally immiscible liquids, and is characterized chiefly by a drum or cylinder rotatable about its axis of symmetry and containing in fixed relation therewith a number of cylindrical axially juxtaposed elements each having axially-spaced inwardly-projecting annular flanges fixed with its inner wall. Each contiguous pair of these flanges forms with the peripheral wall of the elements, a number of successive annular channels or chambers. Alternate ones of these chambers are mixing chambers and the remaining ones are decantation chambers, so that there are formed, in succession, a mixing chamber, a decantation chamber, and so on.

A tube fixed at its ends, passes centrally in and through the drum and the chambers formed therein. The tube has a number of mixing blades or disks fixed thereto, there being one blade in each mixing chamber so that as the drum and liquids rotate substantially as a unit, the fixed blades act to mix liquids contained in these chambers.

The several chambers are interconnected by passageways so that a first liquid introduced at the first end of the drum passes in succession to a mixing chamber, then into a decantation chamber, the next mixing chamber, and so on to the second end of the drum where it is withdrawn from the final decantation chamber. Likewise, passageways are provided between chambers so that a second liquid introduced into the end mixing chamber at the second end of the drum, traverses each chamber in succession toward the first end of the drum and is withdrawn from the decantation chamber at the first end. Thus the two liquids pass generally in opposite directions along the drum and are mixed, then decanted, a number of times depending upon the number of mixing and decantation chambers with which the drum is provided.

In the aforesaid apparatus the two normally immiscible liquids are first broken up and thoroughly intermingled in a first mixing chamber, aided by the action of the mixing blade therein. Then the emulsion is passed to the next succeeding decantation chamber where the heavier liquid is forced radially outwardly by centrifugal force and separately conducted toward one end of the drum, into the next contiguous mixing chamber. The lighter liquid is forced by the heavier liquid, into a radially-inward ring-like form or body and is passed in the other axial direction to the next mixing chamber. In each decantation chamber a first set of orifices is arranged radially outwardly of the axis of rotation, a distance to receive and transmit the heavier liquid only; and a second set of orifices is arranged radially inwardly of the first set to receive and transmit the lighter liquid only.

Thus the two liquids are, in rapid succession, thoroughly mixed and decanted in a predetermined number of stages or steps, so that the method is carried out with the aid of centrifugal force, quickly and efficiently, in an apparatus of moderate compact size and form for the selected capacity or rate of volume of liquids treated per unit time.

The present invention relates to a construction of mixing chambers which results in improved action by affording better and more intimate mixing and circulation of the liquids, while maintaining the generally opposite directions of flow of the liquids and other benefits as taught by the aforesaid principal application.

For this purpose there are provided a number of auxiliary or collecting chambers each associated with a respective mixing chamber and disposed between each mixing chamber and the next succeeding decantation chamber upstream with respect to the direction of flow of the lighter liquid through the apparatus. The purpose of these auxiliary chambers is to direct the heavier liquid into contact with the lighter liquid prior to passage to the mixing chamber. The lighter liquid phase passes to the mixing chamber from the decantation chamber upstream, while the heavier phase is supplied to the radially outward portion of the collecting chamber from the decantation chamber next downstream and passes into contact with the lighter liquid as the two enter the mixing chamber. The two phases thus assembled or collected pass together into the corresponding contiguous mixing chamber.

By this construction the two liquid phases simultaneously enter each mixing chamber in the same direction and with the aid of the mixing blade therein, are efficiently propelled independently of the densities of the two liquids, while being vigorously and thoroughly intermingled.

According to another characteristic of the invention, each of the aforesaid mixing blades or disks is provided upon its periphery with a number of circumferentially-spaced notches which have impelling surfaces so disposed as to effect an axial component of thrust upon the two liquids so that circulation thereof is improved. The diameter of each disk is appreciably reduced over that of the apparatus of the principal application, and the peripheral wall of each mixing chamber is located at a correspondingly reduced distance from the axis of rotation. Or, stated in another way, the effective diameter of the mixing chambers is less than the corresponding diameter of the decantation chambers. This results in reduced friction, enables greater speed of processing, and decreases the power requirement for a given rate of flow through the apparatus.

Therefore, among the chief objects of the invention are to provide an apparatus of the type described (a) which affords greater capacity or rate of flow, size for size, over that disclosed in the previously-identified principal application, (b) which reduces power requirements for any particular size or capacity of apparatus, (c) which comprises parts which are relatively easy to fabricate with finished friction-reducing surfaces and which are readily assembled into a unitary apparatus, (d) which enables reduction in size of the mixing blades, (e) which provides a structure wherein the axis of rotation may be vertical and the successive chambers of mixing and decantation superposed, and (f) the forces developed by rotation of the apparatus materially assists in propulsion of the liquids axially from one decantation chamber to the next mixing chamber.

Other objects and advantages of the invention will become clear to those skilled in the art, after a study of the following detailed description, in connection with the accompanying drawing.

Figure 1:
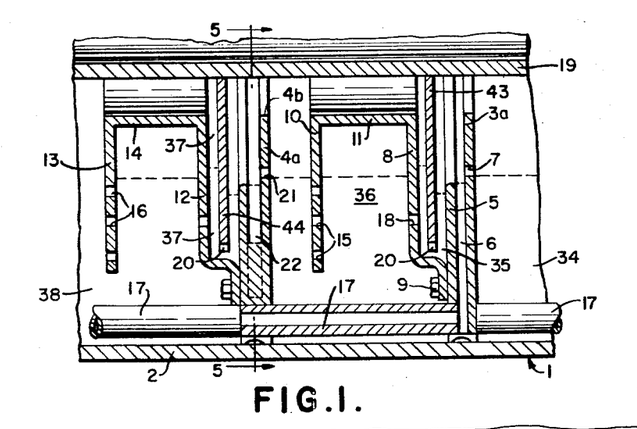
FIGURE 1 shows a first form, in section through the axis of rotation of the drum, the axis being horizontal.

Referring to FIGURE 1, 1 identifies in general a portion of the drum, journaled for rotation on an axis as shown in FIGURE 1 of the aforesaid principal application, and including tubular element 2. The tube 19, a portion only of which is shown, is fixed against rotation and has a number of mixing blades fixed concentrically thereon and in spaced relation therealong. Two of these blades 43 and 44 are shown, located within respective mixing chambers 35 and 37. FIGURE 1 shows three decantation chambers 34, 36 and 38; and since they are alike, a description of one of them will suffice.

Figure 5:
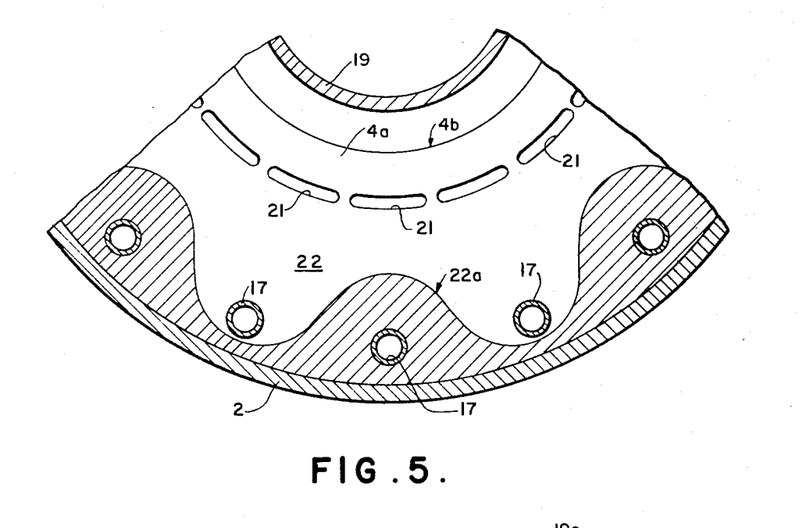
FIGURE 5 is a section of line 5—5, FIGURE 1.

Chamber 36 is formed by and between two relatively thick circular rings 3a and 4a, which are alike in construction. Referring also to FIGURE 5, ring 4a has a circular outer periphery sized for a smooth fit within drum 2. Between its two planar end faces or surfaces the ring is hollowed out to define a collecting chamber 22 having a radially-outward or bottom surface of sinusoidal, wave-like or undular form as indicated at 22a, FIGURE 5. The rings such as 3a and 4a defining a set of chambers between them, are of identical construction, but are relatively angularly fixed about their common axis, the axis of drum 2. As shown upon FIGURE 5, each collecting chamber is thus formed by the undular peripheral wall thereof, with eight "crests" and eight "troughs," there being a trough between each consecutive pair of crests. In the construction shown therefore, the two rings are relatively angularly related by 22½°, so that each trough of one ring lies in a common radial plane with a crest of the other ring. The side walls of the chamber defined by the two planar faces of the ring are unequal in radial dimensions. As viewed upon FIGURE 1, the right wall indicated at 4b has a radial dimension greater than the left one and has formed therein a number, sixteen in the model illustrated, of equal arcuate slots 21, equiangularly spaced about the axis of the drum.

Starting with the lowermost pipe 17 appearing in both FIGURES 1 and 5, the left end of this pipe has a liquid-tight fit or connection in a hole centered on a crest of the undular bottom wall of chamber 22. The pipe passes through chamber 36 parallel with and closely adjacent to the wall of the drum, and has its right end fitting or threaded into a hole in the next adjacent ring 3a. Since this hole is in communication with a trough in ring 3a and passes only through the left wall thereof, pipe 17 under description, forms a passage conducting heavier decanted liquid from chamber 38 to collecting chamber 6. In the construction shown there are eight of these pipes 17 in chamber 36, spaced at 45° about the periphery of the rings. There are also eight other pipes in each of the chambers 34 and 38, but referring to chamber 38, the right end of each pipe 17 is threaded or otherwise connected in fluid-tight relation with respective holes in the trough in the left wall of ring 4a, exactly as the right end of pipe 17 passing through chamber 36 and shown upon the drawing, is secured into a hole passing into a trough of wall 5 of plate or ring 3a. Thus these pipes conduct decanted heavier liquid from the decantation chamber not shown, but immediately to the left of chamber 38, into collecting chamber 22. In this manner heavier liquid flows from a decantation chamber and is conducted through pipes 17 into the next adjacent collecting chamber to the right.

Each of the rings 3a, 4a, etc., has end surfaces whose radially inward edges are at different distances from the axis of drum or element 2 so that, referring to ring 3a for example, its right wall edge is closer to the axis than the left one. Circumferentially-spaced arcuate openings 7, which may be like 21, FIGURE 5, in shape and spacing, are at the correct distance from the axis to admit passage of lighter decanted liquid therethrough, into the contiguous mixing chamber. Thus, continuing reference to ring 3a by way of example, heavier decanted liquid passing to the right through pipes 17 in decantation chamber 36, enters collecting chamber 6, moves radially inwardly and meets lighter decanted liquid passing leftwardly through openings 7. The two liquids then pass over and across the edge of the left wall of ring 3a, into mixing chamber 35 wherein they are agitated and mixed, assisted by the action of blade 43.

Figure 2:
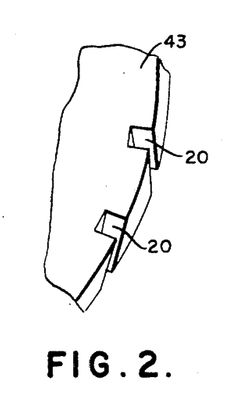
FIGURE 2 is a detail prespective view of a portion of one of the mixing blades and showing in particular the impelling notches or vanes therein.

An annular plate 8 forms the left wall of mixing chamber 35. This wall includes a peripheral flange axially offset to the right. This flange is connected to ring 3a by machine screws 9. The plate has circumferentially-spaced holes or arcuate slots 18 which conduct the mixed liquids from chamber 35 into decantation chamber 36. The notches 20, FIGURE 2, in the periphery of blade 43 are so sloped that they not only aid in the mixing of the liquids in chamber 35, but also assist in propelling the mixed liquids through orifices 18. Plate 8, as shown, is also provided with an integrally attached central, radially-inward and axially-extending cylindrical sleeve-like portion 11 coaxial of the drum and supporting at its left end a baffle plate 10 in parallel with plate 8. Apertures 15 in plate 10 assist in quieting and separating the liquids in decantation chamber 36, whereby the heavier liquid thrown outwardly by centrifugal force, passes to the right into pipes 17 in chamber 34, while the decanted lighter liquid moves leftwardly through orifices 21, into mixing chamber 37. See FIGURE 5 also.

Since rings 3a and 4a are alike and are associated with like parts, it is sufficient to identfy collecting chamber 22, mixer blade 44, plate 12 forming a wall between mixing chamber 37 and decantation chamber 38, extension 14 integrally connected with plate 12 and supporting circular baffle 13 having arcuate slots or holes 16.

Thus the flow of heavier liquid is from left to right into a collecting chamber, thence with lighter liquid into the corresponding mixing chamber, thence leftwardly with lighter liquid into the contiguous decantation chamber. From this chamber, after decantation, the heavier liquid again passes to the right through pipes 17, into the next collecting chamber. The lighter liquid passes from each decantation chamber leftwardly to the next mixing chamber, then continues leftwardly mixed with heavier liquid into the contiguous decantation chamber, from whence it continues leftward flow into the next mixing chamber. An apparatus constructed in accordance with the invention may, within the limits of practicability, have any number of successive stages each consisting of collecting heavier liquid, mixing with lighter liquid, and decantation.

Figure 6:
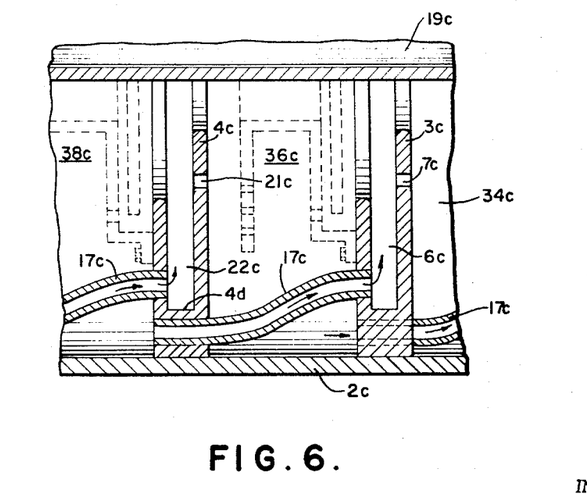
FIGURE 6 is a detail sectional view through the axis of rotation, showing a different arrangement by which heavier liquid is conducted from one decantation chamber into the next collecting chamber.

FIGURE 6 shows a modified construction wherein the bottom wall of each collecting chamber is circular while the rim of plates 3c, 4c, etc., has a radial dimension greater than the outside diameter of pipes 17c. Referring in detail to this figure, tubular element or drum 2c, and axial tube 19c may be like elements 2 and 19, respectively, FIGURE 1. The circular disks or rings 3c and 4c may be of the same general construction and axial dimensions as items 3a and 4a, FIGURE 1, and have a smooth fit with and secured to the inner walls of drum 2c. However, rings 3c and 4c instead of having undular walls as described in connection with FIGURE 5, have cylindrical walls such as 4d, of constant radius. These walls are spaced radially inwardly of the drum wall, to provide for a series of uniformly circumferentially spaced holes each of which receives with a liquid-tight fit, one end of a respective one of a plurality of pipes such as 17c. The pipes are alike and each is bent to have parallel radially-offset ends connected by an ogee curve. The axis of each of these pipes lies in a respective one of a plurality of equiangularly-related planes through the axis of the drum and, in correspondence with the construction previously described in connection with FIGURE 5, there may be eight of these pipes traversing each decantation chamber. Thus in such construction, ring 4c for example, will have eight holes each receiving the end of a respective pipe 17c traversing chamber 36c. Each of these pipes curves inwardly and at its right end is secured with a respective one of a plurality of holes in the left wall of ring 3c, so that liquid from decantation chamber 38c is conveyed through decantation chamber 36c, into collecting chamber 6c.

The two walls of each of the rings such as 3c and which define between them annular collecting chamber 6c, have radially inward circular edges at different radial distances from the peripheral wall of the drum. The right wall as viewed upon the figure, is provided with arcuate slots 7c like those indicated at 21, FIGURE 5, through which lighter liquid flows from decantation chamber 34c leftwardly, for mingling with heavier liquid moving radially inwardly in collection chamber 6c. The two liquids thus flow together across the edge of the left wall of the ring, into a mixing chamber. Since the structure by which each mixing chamber is formed, in association with the aforesaid left wall, may be the same as items 8, 10, 11, etc., FIGURE 1, these items, as well as the mixing blades fixed with tube 19c, one in each mixing chamber, are shown in dotted lines only. The operation is essentially like that previously described in connection with FIGURES 1 and 5. The advantage of the construction of FIGURE 6 is that the curved tubes 17c facilitate the formation by casting or milling, of collecting chambers 6c, 22c, etc., because the peripheral walls thereof are cylindrical rather than undular.

Figure 3:
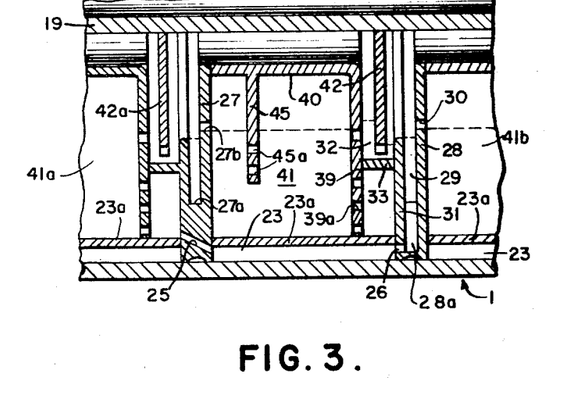
FIGURE 3 is a detail section corresponding to FIGURE 1, of a modified form.

FIGURE 3 shows still another form which the chamber-forming rings may have. The drum 1 and tube 19 may be the same as shown upon FIGURE 1. Thick rings 27, 28, which correspond respectively to 4a, 3a, FIGURE 1, have a smooth fit within and are attached in any suitable way to the inner peripheral surface of the drum. As in FIGURE 1, the rings are formed to define radially inward circular edges, left and right, of lesser and greater radial dimensions, respectively, measured inwardly from the peripheral wall of the drum, and define between them an annular collecting chamber such as 29 for ring 28, and which have cylindrical bottom walls spaced an appreciable distance inwardly from the periphery of the ring, as indicated at 27a. At equally-spaced points, these bottom walls are drilled or otherwise formed with radial passageways which extend nearly to, but stop short of the outer periphery of the ring. One of these passageways is identified at 28a in ring 28. The left wall of each ring is formed, contiguous to its periphery, with axially extending holes such as 26. Each of these holes opens into a respective one of passageways 28a.

A plurality of members 23a form passageways 23 and are secured to the walls of the drum, parallel with the axis thereof. These members may be arcuate or semi-circular in cross section and at its right end each terminates over and in communication with a corresponding hole 26. At its left end each of these members 23a terminates over and in communication with a corresponding one of a number of holes 25 formed in sloping position in the periphery of each ring 27, 28, etc. Because of this sloping arrangement each hole 25 opens at its left end as viewed upon the figure, into a decantation chamber. The members 23a may have their longitudinal edges welded or otherwise secured to and along the inner peripheral wall of the drum, while their end surfaces are, as shown, in fluid tight contact with respective rings.

Each ring 27, 28, etc. has a plurality of these holes 25, 26 formed therein. In any one ring there will be, for example, eight equally spaced passageways 28a and a like number of holes 26. Midway between each consecutive pair of holes 26 there will be a hole 25, making a total of sixteen holes 25, 26 in each ring. Thus if the rings are assembled and fixed in positions of 22½° of relative rotation within the drum, heavier liquid passes from any one of the decantation chambers such as 41a, to the right through holes 25, channels 23, and holes 26, into mixing chamber 29. Thus in the particular construction being described, there may be eight of these members 23a is each chamber, equally spaced about the peripheral wall of the drum and acting to positively maintain the rings in axially spaced positions.

Continuing reference to FIGURE 3, the rightward wall of ring 28 has a series of circularly-arranged arcuate circumferentially-spaced openings or slots like those shown at 21, FIGURE 5. These are disposed on a radius such that they are a little radially inwardly of the circular edge of the left wall, as indicated at 30. Thus lighter decanted liquid flowing to the left through slots 30 to the mixing chamber, immediately meets heavier liquid moving radially inwardly in and along radial bores 28a and collecting chamber 29. The two liquids pass together over the circular edge of the left wall, such as 31, of ring 28, into a mixing chamber 32. The left wall of this chamber is formed by a circular plate 39 shown as integral with a cylindrical core 40 whose left end fits against the right wall of ring 27. The peripheral wall of the mixing chamber is formed by a ring 33 coaxial of and spaced radially inwardly of the drum. This wall may be a separate item rigidly attached to and between the right and left side walls; or it may be formed as an integral part of one wall and in fluid-tight contact with the other. Mixing blade 42 has its periphery closely adjacent wall 33 and as clearly shown, has a radius less than the blades 43 and 44 of FIGURE 1.

The mixed liquids are impelled to the left through openings or arcuate slots 39a in wall 39, into decantation chamber 41. A circular baffle 45 having therethrough a series of arcuate slots or apertures 45a, is attached to or formed integrally with core 40, and acts to smooth the turbulence of liquids decanted in this chamber. The lighter liquid continues its leftward flow through slots 27 in the right wall of ring 27. The heavier liquid is impelled radially outwardly by centrifugal force and, passing to the right through apertures or slots 39a in wall 39, moves into an annular chamber formed between the wall of the drum and wall 33. From there it again moves to the right into one of the plurality of inclined bores in ring 28 which are not shown but which, as previously described, are like bores 25 one of which appears in ring 27, FIGURE 3, and which are arranged in alteration with apertures 26. Thus the heavier liquid moves into passageways 23 traversing decantation chamber 41b, into the collecting chamber to the right, not shown.

The basic action is like that described in connection with FIGURES 1, 5 and 6. The form shown in FIGURE 3, because of the relatively short radii of the mixing blades 42, 42a, etc., has markedly lower power requirements for any given capacity of apparatus and speed of mixing. In all cases the number of stages employed in any particular apparatus is a matter of selection, within the limits of practicability.

Figure 4:
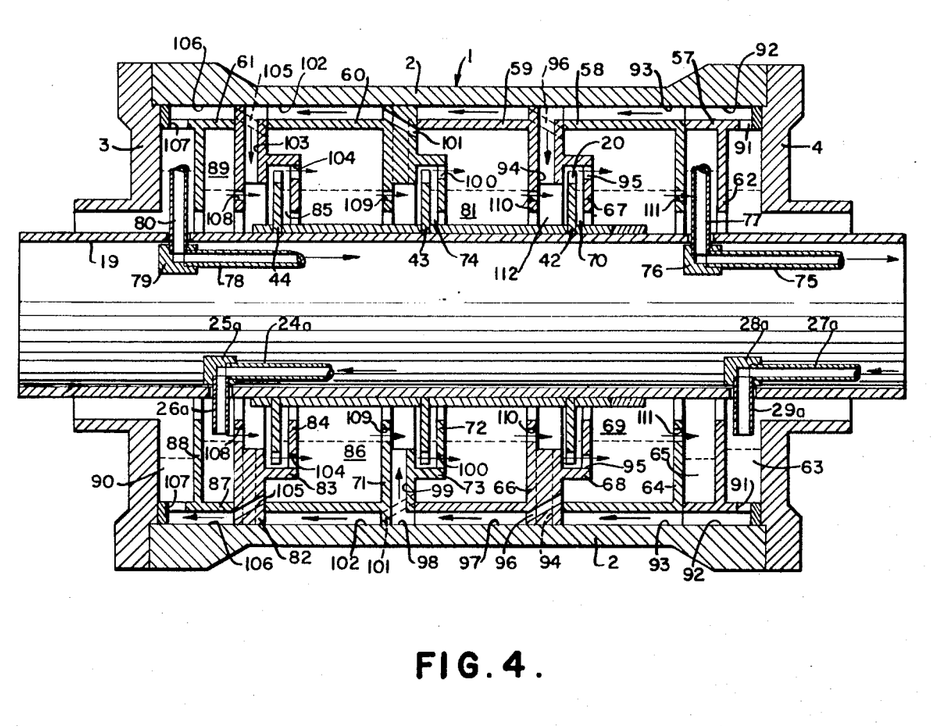
FIGURE 4 is an axial section through the drum, of a modified construction using three stages of mixing and decantation each.

FIGURE 4 shows a form of the apparatus wherein three stages of mixing and decantation each are employed, and the chamber sections are of somewhat different and simplified construction without, however, any change in principle of operation or sacrifice of any of the advantages of the forms shown upon FIGURES 1, 3, 5 and 6. Since the mounting for the sections shown upon FIGURE 4 may, except for possible changes in dimensions, be essentially like that described in connection with the aforesaid principal application Ser. No. 566,911, it is deemed sufficient to identify drum 1 including tubular element 2, end plates or pieces 3 and 4, and fixed tube 19 extending axially in and along element 2. 24a identifies an inlet pipe for lighter liquid, connected through fitting 25a with inlet nozzle 26a. Lighter liquid is withdrawn through pipe 75 connected by fitting 76 with pipe section 77. Heavier liquid is introduced through feed pipe 27a, connected by 90° fitting 28a with nozzle 29a, and extracted through pipe 78 connected by fitting 79 with pipe section 80. As shown, all pipes 24a, 27a, 75, 78 extend in and along tube 19 to the right and exterior of the apparatus where pipes 24a and 27a are connected respectively with sources of supply of lighter and heavier liquids. Similarly, pipes 75 and 78 are connected with containers to receive, respectively, the lighter and heavier liquids exhausted from the apparatus. Drum 1 is mounted for rotation about its longitudinal axis of symmetry, by means not shown but which may be the same as the means disclosed in the principal application. Likewise, tube 19 is mounted in fixed position coaxially of the drum, by means like those depicted in said application. Means such as a ring gear, not shown, attached to and about the periphery of end piece 3, for example, meshes with a pinion driven by an electric motor, to rotate the drum at relatively high rates, all as fully disclosed in the principal application. It is appropriate to state at this point that while in the forms shown upon FIGURES 1 through 6, the axis of drum rotation is indicated as horizontal, this may be inclined at 90° to the horizontal, or at intermediate angles, because in operation, centrifugal forces are sufficient to overpower those of gravity.

The species of FIGURE 4 uses three stages of mixing and decantation each. The annular ring-like chambers in which these stages are carried out are defined by radially- and circumferentially-extending, axially-spaced flanges integral with cylindrical sections fitting within and secured to tubular element 2. These sections are identified, right to left, at 57, 58, 59, 60 and 61. All sections have finished exterior cylindrical surfaces for a smooth fit within drum 1 and are provided with means, not shown, for fixing them in end-to-end liquid-tight contact with respect to each other and to tubular element 2.

Right end section 57 has its right end wall in liquid-tight contact with end piece 4, and an integral flange 62 which, with the end piece, defines an annular chamber 63 for receiving heavier liquid entering through nozzle 29a. At its left end this section abuts section 58 which has a single flange 64. Flanges 62 and 64 define between them an annular chamber 65. Pipe section 77 is located within this chamber and by reason of momentum of the rotating liquid, extracts lighter liquid through pipe 75.

Section 59 next to the left, has an axially thickened right end formed with a flange 67 axially offset to the right and connected by integral cylindrical wall 68 with end wall 66 to thus define annular decantation chamber 69 in cooperation with flange 64 and the adjacent wall 66. Because of the radially-inward location of peripheral wall 68, mixing chamber 70 has a smaller radius than chambers 63, 65 and 69. A mixing blade 42 in this chamber has the same general form as depicted for blade 43, FIGURE 2, and is similarly provided with impelling notches or surfaces 20 at uniformly-spaced locations about its periphery. This blade is, of course, fixed with tube 19. The surfaces defined by the notches 20 are properly angled to effectively impel liquids mixed in chamber 70, to the right into decantation chamber 69, as subsequently described. The mixed liquids pass through openings 95.

The left end edge of section 59 abuts the thickened end wall 71 of next section 60. Since this section is like section 59, described in the preceding paragraph, it is sufficient to identify offset flange 72, cylindrical wall 73, mixing chamber 74, blade 43 fixed therein, and decantation chamber 81 formed by and between end 66 and flange 72.

An axially thickened ring 82 is located immediately to the left of section 60. This ring has cylindrical wall 83 and offset flange 84 which conjointly define third mixing chamber 85 and, with end 71 of section 60, defines decantation chamber 86. The left end wall of ring 82 abuts left end section 87 having integral flange 88. This flange in conjunction with the ring, defines annular chamber 89 into which lighter liquid is fed, and which in cooperation with end piece 3, defines chamber 90 from which decanted heavier liquid is exhausted.

The peripheral surfaces of the several sections are each milled or otherwise formed with longitudinally-extending channels. There may be three of these channels in each section, parallel with the axis thereof and uniformly circumferentially spaced about the periphery. Thus, heavier liquid fed into chamber 63 from pipe 29a, passes radially outwardly through one of orifices 91, into a corresponding one of channels 92 in section 57, passes along channels 93 in section 58 anl moves inwardly through radial passageways 94 formed in the thickened end 66 of section 59, into mixing chamber 70. After intermingling the liquids pass together to the right, through apertures or arcuate slots 95, into decantation chamber 69.

In chamber 69 the liquids are decanted and the heavier exits to the left through inclined radially-outward passageways 96 in end 66 and into channels 97 in the peripheral wall of section 59, and channels 98 and radial bores 99 in end wall 71 of section 60, into mixing chamber 74. In this chamber it is again mixed with lighter liquid, assisted by blade 43. The liquids then pass together through apertures 100 in flange 72, into decantation chamber 81.

From chamber 81 the heavier liquid exits through inclined radially outward passages or bores 101 in end wall 71 of section 60, into peripheral channels 102 and thence moves inwardly through bores 103 in ring 82, into mixing chamber 85. From this chamber it flows, intermingled with lighter liquid, through apertures or arcuate slots 104 in flange 84, to decantation chamber 86. From this chamber the liquid departs through passageways 105 in ring 82, passes along peripheral channels 106 in ring 61, thence through orifices 107 into chamber 90 where it is collected by pipe 80 and exhausted to storage exteriorly of the drum.

Lighter liquid enters chamber 89 through nozzle 26a and flows through arcuate slots or apertures 108 in the flange of ring 82, where it meets heavier liquid entering through radial bores 103. With the aid of mixing blade 44 the two liquids are broken up, thoroughly intermingled in chamber 85 and pass together through arcuate slots or apertures 104 to decantation chamber 86. Lighter liquid exits from this chamber through apertures 109 in the flange of end wall 71 of section 60, into mixing chamber 74, passes with the heavier liquid through apertures 100, to decantation chamber 81. From this chamber the lighter liquid exits through apertures 110 in the flange of end wall 66 of section 59, to mixing chamber 70. From chamber 70 the liquids pass together through apertures 95 in flange 67, to decantation chamber 69, from which the lighter liquid flows through apertures 111 to chamber 65 where, due to its rapid rotation with the drum, it is picked up by pipe 77 and conveyed through pipe 75 to storage exteriorly of the apparatus.

In general, the relative positions of the several channels and apertures with respect to the axis of rotation of the drum, are similar to those of the principal application. In each decantation chamber the heavier liquid is forced into exterior ring-like form extending about the inner ring of lighter liquid. Thus the heavier liquid is passed to the next mixing chamber through passageways and channels which are closely adjacent the exterior wall of the drum, while the lighter liquid exits through apertures such as 110, located radially or near the inner cylindrical surfaces thereof and which surfaces are indicated by dotted lines in each of the decantation chambers, FIGURE 4. The number of channels, apertures and bores in the several sections, flanges and end walls is not critical and may be in sets of three, uniformly circumferentially spaced. Or they may be as shown at 21, FIGURE 5. Of course, the total effecive area of each set is adequate for transfer of the fluids at the desired rates of flow therethrough. In FIGURE 4, for clarity of illustration, some of these channels etc., are shown in positions rotated from true position, about the axis of the drum. Reference is made to FIGURE 3 of the principal application for one satisfactory arrangement of circumferential positions and relations of the channels and apertures.

Sections 59 and 60 are duplicates and passageways such as 101 for example, in end wall 71 of section 60, are therefore in fixed relation each in communication with a respective one of channels 102. Therefore in assembly it is necessary only to make sure that, for example, each channel 97 of section 59 is in registration with channel 98 in section 60. Under such conditions all other openings in the two sections will be in proper registration.

It should be noted that each mixing chamber has a radial dimension reduced over the corresponding dimension of the decantation chambers, and that the axial dimension of the mixing chambers is determined by the axial thickness of walls or rings 66, 71 and 82, plus the axial offset of flanges 67, 72 and 84. Since each mixing blade is located adjacent its corresponding flange, there is formed a free annular space within each mixing chamber, into which both lighter and heavier liquids are introduced. One of these spaces is identified at 112 for mixing chamber 70; and it will be noted that heavier liquid coming in through bores or passageways 94 immediately meets lighter liquid entering through apertures 110, thus improving the efficiency and completeness of mixing under action of blade 42. In addition it is to be noted that the exit apertures 95 leading from mixing chamber 70, for example, are directly opposite the impelling surfaces in the periphery of blade 42, so that the mixed liquids are forcefully impelled into the next decantation chamber, in this case, chamber 69. It is also seen that end walls 3 and 4 of the drum directly form one wall of each chamber 90 and 63, respectively.

Figure 7:
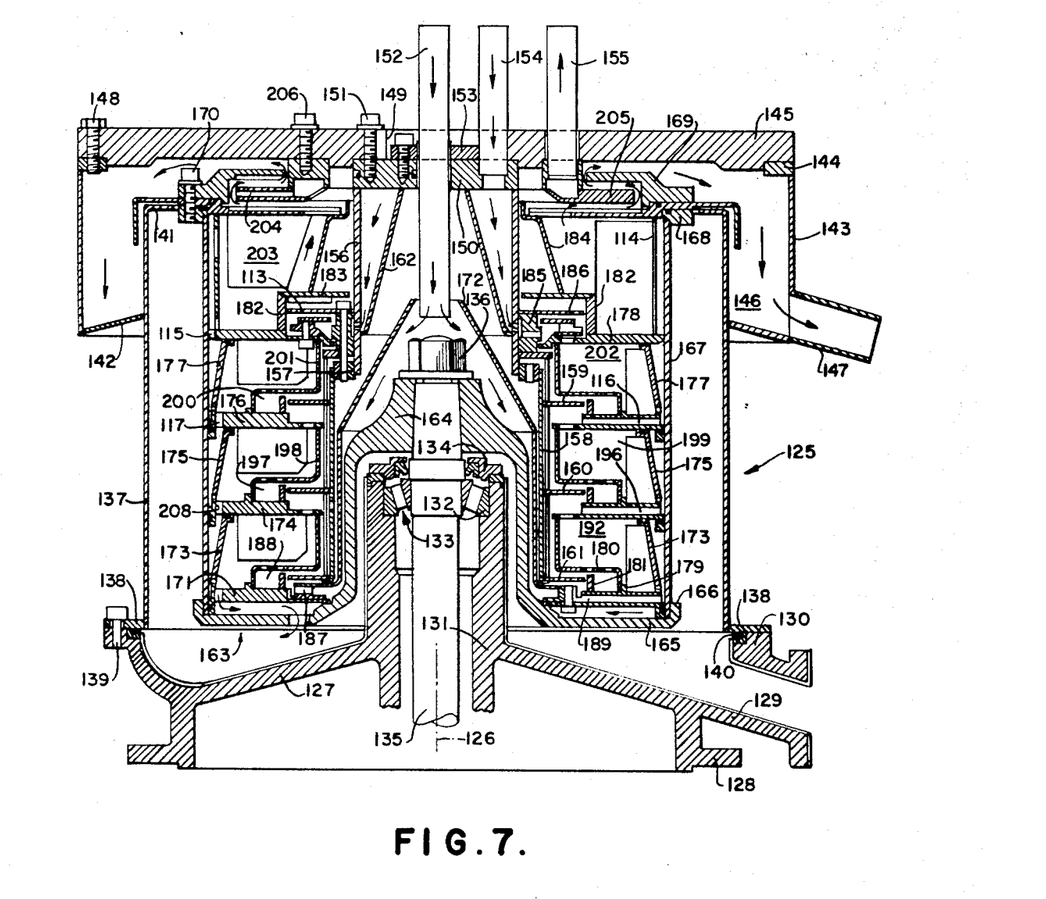
FIGURE 7 shows in axial vertical cross section a complete apparatus having a vertical axis of rotation.
Figure 8:
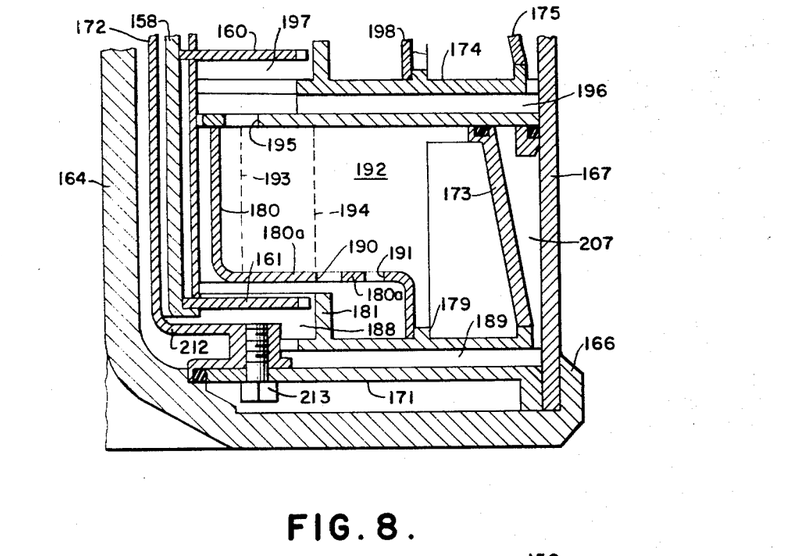
FIGURE 8 is a detail axial sectional view to an enlarged scale, of the lower right hand portion of the rotating assembly, as viewed upon FIGURE 7.
Figure 9:
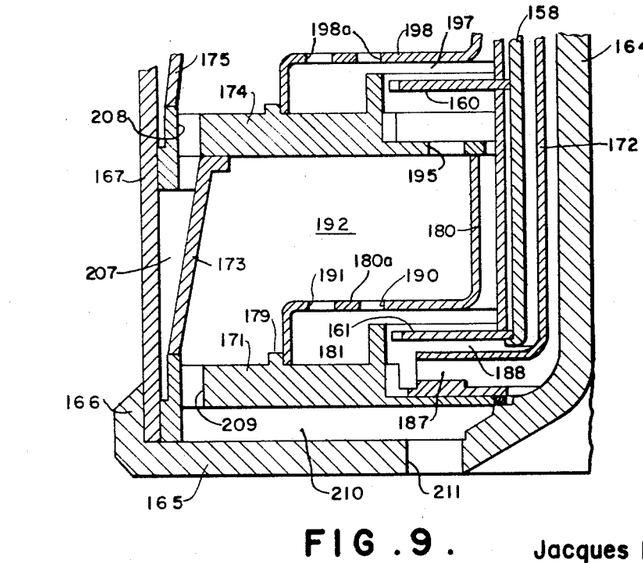
FIGURE 9 is a detail axial sectional view to an enlarged scale, of the lower left hand portion of the elements as viewed upon FIGURE 7.

FIGURES 7, 8 and 9 show a form of apparatus wherein the parts are especially constructed for rotation about a vertical axis. Referring in detail to these figures, a casing is generally identified at 125, having a vertical axis of symmetry 126. The casing is formed with a heavy base casting 127 having a flange 128 by which the apparatus is bolted to a foundation, a flanged radial outlet 129 for heavy liquid, and a circular, upwardly-facing finished surface 130. A sleeve 131 forming an integral part of casting 127, projects upwardly coaxially of axis 126 and has its upwardly-facing open end counterbored to receive the outer race 132 of an antifriction bearing 133. A seal 134 secured to the upper rim of the sleeve, closes the annular space between the sleeve and the upper end of a shaft 135 journaled in bearing 133 and extending downwardly through a second antifriction bearing, not shown. The shaft is connected at its lower end with a source of power, not shown, and by which it and all parts connected therewith may be rotated at high speed. The upper end of the shaft is tapered to provide a seat for a rotor assembly 163, subsequently described, and held to the shaft by nut 136 on the threaded reduced upper terminus of the shaft.

Continuing description of casing 125, a cylindrical body 137 of relatively thin metal, has a flange 138 welded to its lower end and which is secured to surface 130 by a plurality of uniformly- and circumferentially-spaced cap screws, one of which is indicated at 139, to thereby form a pressure-tight joint in connection with O-ring seal 140. Body 137 is flanged inwardly at its top edge, as indicated at 141.

A frustoconical ring 142 has its inner periphery welded to body 137 below the top edge of the body. A cylindrical shell 143 of larger diameter than the body is welded to the outer periphery of the ring and extends upwardly to terminate at a level above flange 141, in a thickened inwardly-extending flange 144 welded thereto. This shell in conjunction with a heavy circular cover plate 145, forms a chamber 146 for the collection and exhaust by way of connection 147, of lighter liquid in those cases where no exhaust pump is employed. The cover plate is recessed at its lower peripheral surface to receive flange 144 with a snug fit. Uniformly- and circumferentially-spaced cap screws only one of which is shown at 148, hold the cover in place.

This cover 145 has a central opening 149 which is counterbored to receive a circular plate 150 held to the cover by cap screws one of which is identified at 151. Plate 145 has a central opening through which a pipe 152 passes with a snug fit. As will be explained later in detail, lighter liquid is fed downwardly into the apparatus, through this pipe. A packing gland generally identified at 153 assures a fluid-tight joint between the pipe and plate. Plate 150 also has a radially offset threaded opening to receive the threaded lower end of a pipe 154 through which heavier liquid is fed into the apparatus. A third pipe 155 extends through a radially-offset hole in cover plate 145, for the evacuation of lighter liquid when an exhaust pump therefore is employed. It is important to note that the parts thus far described are fixed and do not rotate.

A length of tubing 156 is welded at its upper end to the lower peripheral surface of plate 150. Tube 156 has a ring 157 secured as by welding to its lower end. This ring has a number of uniformly-spaced threaded holes therethrough. A cylindrical sleeve 158 has its upper end fitting about and welded to the ring. The sleeve depends to a point near the lower end of the apparatus and, in turn, has annular mixing blades 159, 160 and 161 secured thereto at spaced intervals therealong, it being noted that the apparatus shown employs four stages of mixing and decantation each. A frustoconical baffle 162 has its upper end welded to the lower surface of plate 150 and its lower end secured in a like manner to the interior of tube 156 near the lower end thereof. A plurality of circumferentially-spaced apertures are provided in tube 156, just above its connection with baffle 162. By this construction, heavier liquid entering through pipe 154 is directed outwardly through these apertures into the first mixing chamber.

Vertical rotary shaft 135 has been previously described. A rotor, generally identified at 163 includes a heavy hub 164 centrally apertured to fit the tapered upper end of the shaft. The hub includes a generally cylindrical skirt which depends downwardly coaxially of sleeve 131 and then flares outwardly to form a base disk 165 having an upturned rim 166. A generally cylindrical casing 167 has its lower end fitting within and welded to this upturned rim and forms an enclosure confining the liquids in their passage through the apparatus. A flange ring 168 has an annular cap 169 secured thereto by a number of cap screws one of which is shown at 170. Rotary casing 167 on the one hand, and fixed tube 156 and sleeve 158, conjointly, on the other hand, thus form between them an annular space within which the several mixing and decantation chambers are defined by members subsequently described.

Starting at the bottom of FIGURE 7, and describing construction shown to larger scale upon FIGURES 8 and 9, a relatively thick annular plate 171 is fixed to base disk 165 and is provided with radial and transverse apertures for passage of the liquids, as subsequently described. A generally cylindrical baffle 172 has its lower flanged rim attached to plate 171 and rises coaxially of axis 126. Its top end is tapered upwardly and inwardly to form an upper apertured end fitting loosely about the lower end of feed pipe 152 so that lighter liquid coming down the pipe is directed radially outwardly and downwardly along the annular space between the skirt of hub 164 and baffle 172, into the lower or first mixing chamber.

Plate 171 has the lower edge of a frustoconical wall 173 fixed, as by welding, to its outer periphery and in spaced relation with the wall of casing 167. The top edge of this wall makes a liquid-tight joint with the under surface of a second heavy annular plate 174, which may be a duplicate of plate 171. A second frustoconical wall 175 surmounts plate 174 and its upper end supports a third annular plate 176. A third frustoconical wall 177 has its lower end fixed to plate 176 and at its upper end supports an annular cover plate 178. Plates 171, 174 and 176 may be identical. This is also true of walls 173, 175 and 177 and, of course all of these elements rotate as a unit with shaft 135. Therefore, a detailed description of the assembly of the lower stage only will be sufficient.

Plate 171 is spaced a short distance above base disk 165 to form a chamber into which heavier liquid is discharged after the final decantation stage thereof. The top surface of the plate is formed with a circular ridge 179. The lower circular edge of an annular partition 180 engages this ridge with a snug fit, coaxially of axis 126. As clearly shown upon FIGURES 8 and 9, this partition has lower and upper cylindrical portions of greater and lesser diameters respectively, interconnected by a flat disk-like annular intermediate portion 180a. As also illustrated in FIGURES 8 and 9, this disk-like portion is relatively close to, but spaced from the adjacent upper surface of plate 171, to form therewith a mixing chamber. Mixer blade 161 is disposed in this chamber. An annular or cylindrical wall 181 likewise has its lower edge fixed to the upper surface of plate 171 in spaced relation with, and extending about the periphery of blade 161. Its upper edge terminates short of the annular or intermediate surface of partition 180. The space between cylindrical casing 167 and frustoconical wall 173, forms a passage for heavier liquid coming in from the decantation chamber above, into the lower or final mixing chamber. This is true also, of course, of walls 177 and 175 of the top and intermediate stages.

Annular cover plate 178 has been previously described. This plate has the lower edge of a cylindrical wall 182 fixed to its upper surface, about midway between tube 156 and casing 167. An annular ring 183 has its outer periphery fixed to the top edge of wall 182 and its inner periphery forms an opening loosely fitting about tube 156. A frustoconical baffle 184 has its lower edge attached to ring 183 and extends upwardly to terminate in a neck portion loosely surrounding tube 156. A heavy ring 185 fixed to and about the lower end of tube 156, surrounds the radial apertures therein for the passage of heavier liquid, and supports an impeller disk 186 coaxial of axis 126, which not only forms a baffle opposing the upward flow of heavier liquid therepast, but in addition is provided with teeth or vanes uniformly spaced in and about its periphery and which are so angled with respect to the direction of rotation of the rotary assembly, that any heavier liquid seeping past, is directed downwardly into its correct path.

Tracing first the path of the lighter liquid through the apparatus, such liquid introduced by pipe 152, emerges from the lower end thereof and passes downwardly between hub 164 and baffle 172 wherein it starts to rotate in unison with these rapidly rotating parts. As it arrives at lower plate 171 it passes outwardly through radially disposed passageways therein. One of these is identified at 187, FIGURE 9. Others, not shown, are disposed in equiangularly spaced relation about axis 126.

These passageways open into the mixing chamber in which blade 161, previously mentioned, is located. At the same time, heavier liquid enters from the decantation chamber of the intermediate stage above, as subsequently described, enters the annular chamber formed between casing 167 and frustoconical wall 173, and passes from this chamber, radially inwardly along passageways one of which is identified at 189, FIGURE 8, into mixing chamber 188, where it immediately meets lighter liquid entering through passageways 187. The two liquids are intermingled in chamber 188, aided by mixer blade 161 which is fixed with relation to the rapidly rotating walls defining the chamber. The blade, as well as all other mixer blades of the apparatus, may be formed with teeth or vanes on its periphery and which aid in agitating the liquids and effecting an intimate mixture thereof. These vanes may also be inclined to axis 126 to assist in impelling the mixed liquids into the decantation chamber above.

Referring more particularly to FIGURE 8, the horizontal or planar wall 180a of partition 180 has therein two series of holes one each of which is identified at 190 and 191, respectively. Holes 190 are arranged at one radius about axis 126, equiangularly disposed. Holes 191 are similarly arranged but at a larger radius. The two series of holes located as shown, enable the mixed liquids to pass together upwardly into decantation chamber 192 conjointly formed by partition 180, wall 173, and second annular plate 174, aided if desired, by vanes on the periphery of mixer blade or disk 161.

In chamber 192 the rapidly swirling liquids are decanted. The heavier liquid forms a ring exteriorly of the lighter liquid which is thereby formed radially inwardly. The rates of feed of the two liquids will be such that the lighter liquid forms inner and outer substantially cylindrical surfaces as indicated by the dotted lines 193, 194, FIGURE 8, denoting elements of these surfaces. Line 194 also, of course, denotes the radially inward surface of the spinning heavier liquid.

From chamber 192 the lighter liquid passes upwardly through holes in plate 174. One of these is identified at 195, FIGURE 9, where it again meets with heavier liquid entering through radial passageways one of which is shown at 196, FIGURES 7 and 8, and is again mixed with heavier liquid in mixing chamber 197, assisted by the action of blade 160.

Since the passage of lighter liquid upwardly through the second and third stages of mixing and decantation each, is the same as that just described for the first stage, it is sufficient to explain that from mixing chamber 197 the mixed liquids pass upwardly through holes in the horizontal planar portion of annular partition 198, into decantation chamber 199. From this chamber the lighter liquid passes upwardly through holes in annular plate 176, to mixing chamber 200, containing mixer blade 159, thence through holes in partition 201, arranged and spaced similarly to holes 190, 191 in partition 180 as previously described, into decantation chamber 202. The lighter liquid next passes upwardly through holes in cover plate 178, in number and positions corresponding to holes 190 in partition 180, where it again meets heavier liquid entering through pipe 154 from a source exteriorly of the apparatus, and is mixed therewith, aided by mixer blade 186.

The mixed liquids next pass upwardly through apertures in flat ring 183, into decantation chamber 203 where they are again separated by centrifugal force, as previously. The lighter liquid passes upwardly exteriorly of baffle 184 and tranverses a labyrinth passageway as indicated by the arrows upon FIGURE 7, to exhaust chamber 146 from which it is drawn through connection 147. A hollow ring 205 is secured to the under side of cover plate 145, by cap screws one of which is identified at 206. This ring is provided with a radial passageway 204 so inclined with respect to the direction of rotation or swirl of lighter liquid that the liquid is impelled into the passageway and travels through the ring to the lower end of exhaust pipe 155 having connection with the ring. Thus lighter liquid may be exausted either through conduit 147 or 155, it being understood that suitable valves in these conduits will enable the selection of either, as conditions dictate.

Heavier liquid is introduced into the apparatus through feed pipe 154 and passes downwardly between tube 156 and baffle 162. At the lower end of this baffle the liquid is directed radially outwardly through radial passageways in ring 185, into the top or upper mixing chamber 113 containing blade 186. After mixing with lighter liquid, followed by decantation in chamber 203, the heavier liquid passes radially outwardly through openings in the base of a cylindrical wall 114, thence downwardly through a number of circumferentially spaced apertures, like 115, FIGURE 7, into the annualar space between casing 167 and frustoconical wall 177. From the base or bottom portion of this space the liquid passes radially inwardly through a number of passageways in plate 176. One of these is identified at 116, FIGURE 7. The liquid thus moves into mixing chamber 200 where it is mixed with lighter liquid and as previously described, passes therewith upwardly through holes in the planar portion of partition 201. These holes are disposed similarly to holes 190, 191 in partition 180, FIGURES 7 and 8. The decanted heavier liquid next passes downwardly through openings in the peripheral portion of plate 176. One of these is identified at 117. These openings conduct the decanted heavier liquid into the chamber formed by and between casing 167 and frustoconical wall 175. From this chamber the liquid passes radially inwardly along passageways in thickened plate 174. One of these is identified at 196, FIGURES 7 and 8. These passageways lead to mixing chamber 197 where the heavier liquid meets decanted lighter liquid moving up from decantation chamber 192, through apertures 195 in plate 174. The mixed liquids pass together upwardly through holes 198a in the planar portion of partition or baffle 198, into decantation chamber 199.

From chamber 199 the decanted heavier liquid moves downwardly through circumferentially-spaced openings in the peripheral portion of plate 174, and into the annular space or chamber 207 formed between casing 167 and frustoconical wall 173. One of these openings is identified at 208, FIGURES 7 and 9. From this chamber the heavier liquid moves inwardly along a number of radial bores or passageways 189, FIGURES 7 and 8, in plate 171, into the lowermost mixing chamber 188, where it again meets decanted lighter liquid entering the apparatus through radial passageways 187, as previously described.

The liquids mixed in chamber 188, assisted by the action of blade 161, move upwardly through apertures 190, 191 into decantation chamber 192 from whence the separated heavier liquid passes downwardly through apertures in the periphery of plate 171. One of these apertures is identified at 209, FIGURE 9. The liquid then enters a chamber 210 formed by and between plate 171 and base disk 165, and passes downwardly and outwardly through one or more holes 211, into the space formed between rotor 163 and fixed cylindrical wall 137, thence to storage through outlet 129.

It will be understood that plates such as 171 are formed with a plurality of radial passageways like 189, equiangularly disposed about axis 126, radially thereof, and that these alternate with a like plurality of apertures 209 also equiangularly disposed. This heavier decanted liquid moving downwardly from chamber 199 is compelled to exit therefrom in and along passageways 189, into mixing chamber 188, and after decantation in chamber 192, can leave this chamber only through apertures 209, to exhaust. Plates 174 and 176 may have the same construction as that just described for plate 171. It is also noted particularly from FIGURE 8 that the lower end of baffle 172 flares outwardly as at 212, to form a thickened ring attached to plate 171 by cap screws one of which is indicated at 213, FIGURE 8.

Thus the action of the apparatus shown upon FIGURES 7, 8 and 9 is basically like that previously described in connection with FIGURE 4. The liquids pass through the successive mixing and decantation chambers in opposite directions and are successively and intimately mixed and decanted in a selected number of stages.

Figure 10:
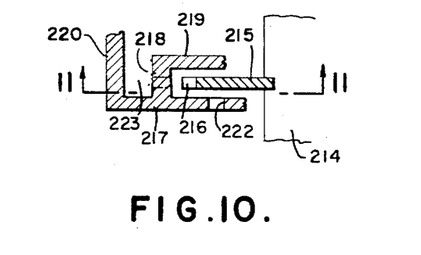
FIGURE 10 is a schematic detail view, partly in section, of a modified form of mixing chamber and mixer blade therein.
Figure 11:
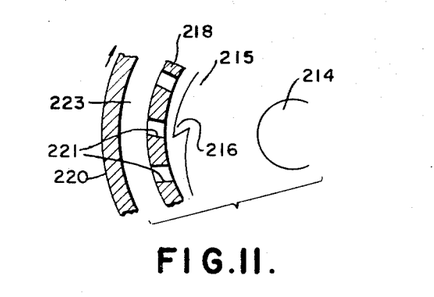
FIGURE 11 is a section taken in a plane identified by line 11—11, FIGURE 10.

FIGURES 10 and 11 show a modified form which the mixing chamber and blades of the apparatus may have. In these figures, 214 identifies a fixed shaft or sleeve similar in purpose to item 19, FIGURE 4, and to 158, FIGURE 7. This shaft has mixer blade 215 attached thereto. As shown upon FIGURE 11, the blade has vanes or teeth 216 formed integrally with its periphery and inclined in the proper direction to throw liquid outwardly by centrifugal force. This is positioned within an annular rotating mixing chamber formed by a part of the rotor and similar in purpose, for example, to section 58, FIGURE 4, and to plate 174, FIGURE 7. The chamber is defined by a base plate 217, a cylindrical wall 218 having a flange 219 integral with its upper edge as viewed upon FIGURE 10. 220 represents a portion of the cylindrical wall of the section. As seen in FIGURE 11, wall 218 is pierced with a number of regularly-spaced apertures 221. In this construction lighter decanted liquid passes upwardly through a plurality of apertures like 222, in base 217, and meets heavier decanted liquid moving downwardly. The two are mixed and move together through apertures 221, into the decantation chamber 223.

Figure 12:
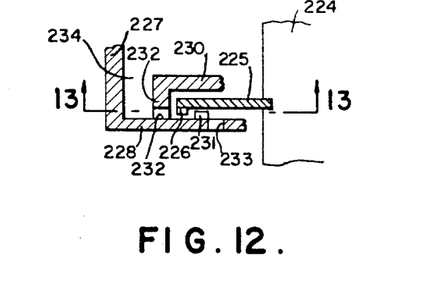
FIGURE 12 is a schematic detail view, partly in axial section, of another modified form of mixing chamber and mixer blade therein.
Figure 13:
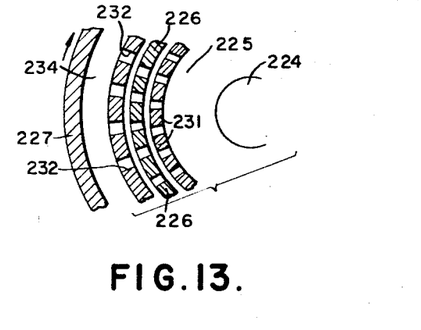
FIGURE 13 is a section taken in a plane identified by line 13—13, FIGURE 12.

In FIGURES 12 and 13 a fixed shaft or sleeve 224 has mixed blade 225 attached thereto. The periphery of this blade has teeth or vanes 226 offset from the under side thereof. The portion 227 of the rotor section comprises a circular base plate 228 including cylindrical upstanding wall 229 and radially and inwardly extending annular flange 230. Just inside the circle defined by vanes 226, base 228 is provided with a circular row of spaced vanes 231 which are essentially coplanar with vanes 226 in a plane normal to the axis of rotation of the rotor, including portion 227, wall 229 is pierced with a circular row of holes 232. By this construction augmented mixing of the liquids is effected. Lighter liquid moving upwardly through holes 233 in base 228 meets heavier liquid entering from above. The two are thoroughly mixed by the interaction between rotating vanes 231 and fixed vanes 226, and impelled outwardly through holes 232, into decantation chamber 234.

Figure 14:
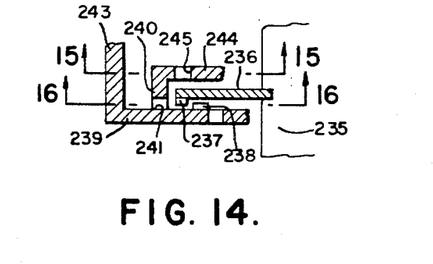
FIGURE 14 is a schematic detail view, partly in section, of still another form of mixing chamber and blade therein.
Figure 15:
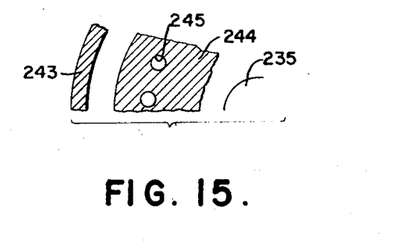
FIGURE 15 is a section taken in a plane identified by line 15—15, FIGURE 14.
Figure 16:
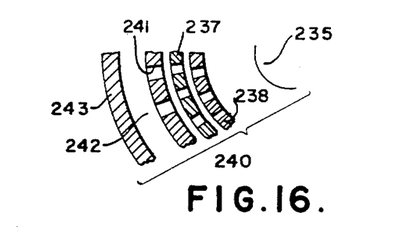
FIGURE 16 is a section taken in a plane identified by line 16—16, FIGURE 14.
Figure 17:
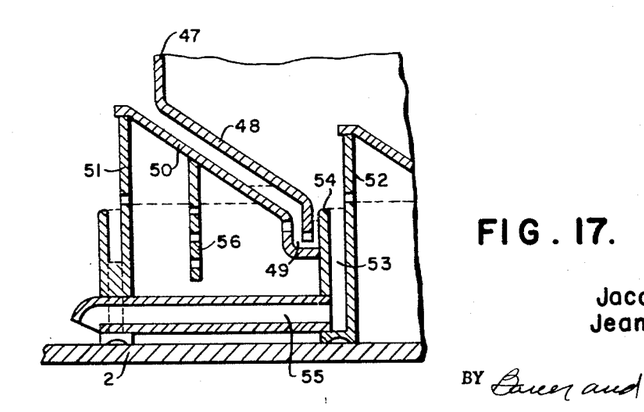
FIGURE 17 shows in section a portion of a construction for a modification wherein the axis of rotation is vertical.

Still another form of mixing means is depicted upon FIGURES 14, 15 and 16. This construction is basically like that described and shown in connection with FIGURES 12 and 13, so that it is sufficient to identify fixed shaft or sleeve 235, mixer blade 236 having vanes 237 extending in a circular path just outside the circular row of vanes 238 fixed to base plate 239. As in FIGURES 12 and 13, cylindrical wall 240 is pierced with holes 241 connecting the mixing chamber in which blade 236 is located, and decantation chamber 242 having outer cylindrical wall 243. Flange 244 integral with wall 240 is pierced with a circular row of holes 245 so that mixed liquids may pass through both rows of holes 241 and 245.

Apparatus constructed according to any of those described herein affords a violent, thorough and rapid mixing of the liquids. When a lesser rate of mixing is desired or will be satisfactory, the rate may be reduced by making the parts such as tube 19, FIGURE 4, and all items carried thereby, rotatable as a unit about an axis common with the axis of rotation of the drum. This makes the apparatus much more versatile than one wherein the mixer blades, etc., are fixed, for by rotating these parts in the same direction as the drum but at a slower speed, a less violent and slower rate of mixing is effected. The relative rate of rotation may, of course, be varied to suit different conditions or different liquids; and where an even more violent and rapid mixing is required or desired over and above that afforded by the top speed of the drum, the tube 19 and mixer blades may be rotated in a direction opposite to that of the drum.

It will be understood that in each of the modifications shown at FIGURES 10 through 16, there will be a plurality of stages each consisting of sequential mixing and decantation of the liquids, in a corresponding number of mixing chambers like those described, each having its own mixing blade therein.

Figure 18:
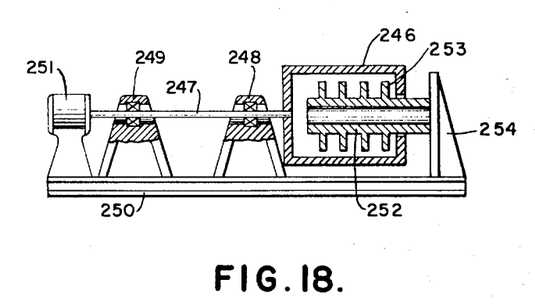
FIGURE 18 shows schematically and to a greatly reduced scale, an arrangement wherein the drum is journaled horizontally in bearings at the same end thereof.
Figure 19:
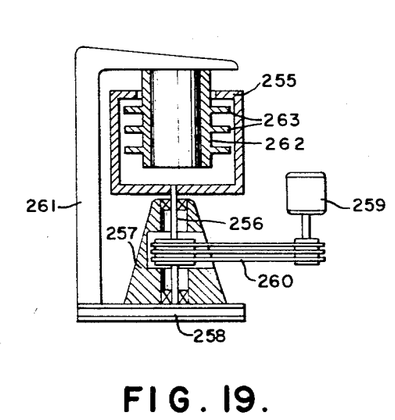
FIGURE 19 shows how the drum may be journaled in bearings both of which are below it.
Figure 20:
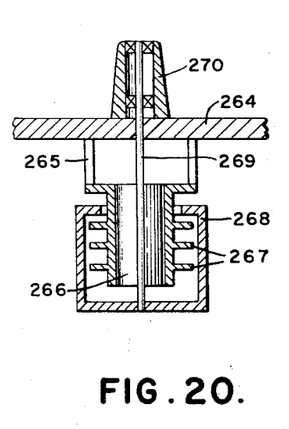
FIGURE 20 shows how the drum may be journaled in bearings both of which are above it.
Figure 21:
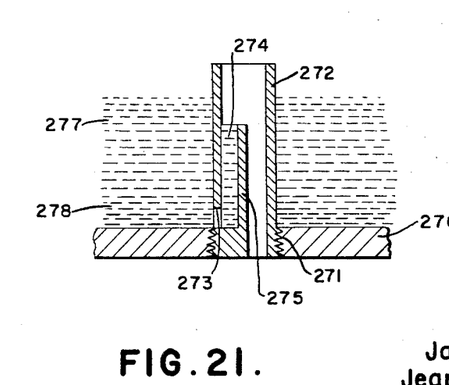
FIGURE 21 is a detail sectional view to an enlarged scale, of an arrangement especially advantageous in forming the decantation chambers in the apparatus of FIGURE 1.

It has been previously mentioned that due to centrifugal action the apparatus is, in operation, essentially independent of gravity. In view of this fact the apparatus may be disposed and operated with the axis of rotation of the drum either horizontal or vertical. FIGURES 18, 19 and 20 show schematically and to a greatly reduced scale a corresponding number of satisfactory disposition of parts. In FIGURE 18, drum 246 has a shaft 247 secured to and extending centrally from one closed end thereof. The shaft is journaled in spaced bearings 248, 249, mounted on base 250. A motor 251 also mounted on the base is connected with the shaft to rotate it. The connection may be through speed-reducing means not shown. Fixed shaft or sleeve 252 having mixer blades 253 attached in spaced relation therealong, is supported by mounting bracket 254, fixed to base 250. It will be understood that each of these blades is positioned in its own respective mixing chamber like 70, FIGURE 4, but that to avoid unnecessary details the sections such as 59, FIGURE 4, by which the several mixing and decantation chambers are formed are omitted. This is also true of FIGURES 19 and 20 to be described.

FIGURE 19 shows a construction wherein drum 255 is journaled for rotation about a vertical axis by shaft 256 and spaced bearings carried by support 257 fixed to base 258. The shaft is driven by motor 259 and belts 260 passing about a pulley fixed to the shaft intermediate the bearings thereof. A bracket 261 rises from base 258 and at its upper end supports a fixed sleeve 262 having three mixer blades 263 secured thereto in axially spaced relation. The sleeve extends through a central opening in the top of the drum, coaxially therewith. As in FIGURE 18, the sections which form the three stages of mixing and decantation each are omitted.

In FIGURE 20 a base or floor 264 carries a bracket 265 depending from the lower surface thereof. This bracket has sleeve 266 fixed thereto, provided with three mixer blades 267. Drum 268 is carried by a shaft 269 extending through it and attached centrally to its lower closed end. The shaft extends upwardly through an opening in floor 264 and is there journaled in spaced bearings carried by a mounting 270. The shaft may be rotated by a motor, not shown, connected with its upper end projecting above the mounting, as in FIGURE 18, or by a motor and belt drive like the one shown upon FIGURE 19. This form is of particular use in connection with nuclear processes because it enables adequate shielding of the drum and contents while permitting safe servicing and operation of the driving mechanism therefor located above floor 264.

It is noted that in FIGURE 18 four mixer blades are shown whereas FIGURES 19 and 20 show three each. This is illustrative of the fact that the number of stages of mixing and decantation each, may be varied as desired, within practicable limits.

Numerous changes of shape, proportions and relations of parts, substitutions of equivalents, and alterations, will readily occur to those skilled in the art, after a study of the foregoing description. The disclosure should therefore be taken in an illustrative rather than a limiting sense; and all changes within the scope of the subjoined claims are reserved.

We claim:

1. In an apparatus for sequentially mixing and decanting in a plurality of stages, first and second normally immiscible liquids of different density, a drum having a longitudinal axis of symmetry and rotatable about said axis, a plurality of anular thickened plates fixed in and fitting said drum, each in a respective one of a plurality of planes normal to and spaced along said axis, each said plate forming with the next contiguous plate, a respective one of a plurality of decantation chambers, there being discrete circumferentially-spaced radial passageway means in each said plate, opening through the inner periphery thereof, means forming a plurality of conduits each fixed with said drum and extending along and adjacent the peripheral wall thereof, each said conduit opening at one end into a respective one of said decantation chambers defined by one side of one said plate, and at its other end opening into the radially outward end of said radial passageway means in the adjacent plate forming one wall of the next adjacent decantation chamber, wall means fixed with each said plate at said one side thereof and axially spaced therefrom to form therewith a respective one of a plurality of annular mixing chambers, each said wall means comprising a cylindrical portion spaced inwardly from the inner wall of said drum and having one side edge fixed with its respective thickened plate, coaxial of said axis, and an annular flange fixed with and extending radially inwardly from the other side edge of said cylindrical portion, a plurality of mixing blades, means mounting each said blade in a respective one of said mixing chambers, coaxially of said axis, first aperture means in each said plate, radially inwardly of the peripheral wall of the drum, for conducting decanted lighter liquid from a decantation chamber at one side of the plate, directly into the mixing chamber fixed thereto, and second aperture means in the flange of said wall means, for conducting mixed liquids from each said mixing chamber into the decantation chamber at the other side of the corresponding plate.

2. The apparatus of claim 1, each said mixing blade having regularly-spaced vanes fixed with its periphery and inclined to mix liquids in its mixing chamber and to impel the mixed liquids through said second aperture means in the flange thereof.

3. The apparatus of claim 1, said conduit forming means comprising a plurality of cylindrical spacer sections coaxial of said axis and each having an outer diameter less than the inner diameter of said drum and having one end fixed to one wall of a respective one of said plates, coaxially of said axis, and its other end abutting the facing wall of the next adjacent plate in liquid-tight contact therewith, said conduit means also comprising a plurality of bores through each plate adjacent the rim thereof and inclined to said axis, each said bore opening at its radially inward end into a respective decantation chamber, and at its other end into the space between the cylindrical spacer section and the wall of the drum, of the next adjacent section.

4. The apparatus of claim 1, the inner periphery of each said plate being hollowed out to form axially spaced walls defining between them a collecting chamber having an undular peripheral wall in the form of a series of alternate crests and troughs, said troughs extending radially outwardly to points adjacent the peripheral wall of the drum to form said radial passageway means, said conduit forming means comprising a plurality of pipes each having one end connected with an opening passing through one plate at a crest portion thereof, and its other end connected with an opening through the contiguous wall only of the collecting chamber of the next adjacent plate, at a trough portion thereof.

5. The apparatus of claim 1, the inner periphery of each said plate being hollowed out to form axially spaced walls defining between them a collecting chamber having a cylindrical peripheral wall adjacent to but spaced from the peripheral wall of said drum, to form said radial passageway means, said conduit forming means comprising a plurality of pipes each bent in a respective radial plane through said axis, each pipe being connected at one end with an opening through one said plate in the rim thereof, and at its other end connected with an opening in the nearest wall only of the next adjacent plate, leading into the collecting chamber thereof.

6. The apparatus of claim 1, said wall means comprising a plurality of spools each in a respective one of said decantation chambers, coaxial of said axis, each said spool having the rim of one end flange axially and circumferentially offset and attached to the contiguous wall of the plate to form therewith a mixing chamber, there being apertures in the end flanges of each said spool for axial flow of liquid therethrough.

7. The apparatus of claim 1, each said wall means comprising an annular disk fixed with said drum in axially spaced parallel relation with a respective one of said plates, at one side thereof, a cylindrical partition coaxial of said axis and having respective edges fixed to the disk and plate to form a mixing chamber, and a cylindrical extension from the inner peripheral edge of said disk, and having its free end in abutment with the next adjacent plate.

8. The apparatus of claim 7, and an anular baffle fixed to said cylindrical extension between the ends thereof, and disposed in a respective decantation chamber, there being apertures in and through said annular baffle.

9. The apparatus of claim 1, first and second cover plates over and obturating respective ends of said drum, means forming first and second discrete annular chambers within said drum at the first end thereof, means forming third and fourth discrete annular chambers within said drum at the second end thereof, a first passageway for conducting heavier decanted liquid from the final decantation chamber at said first end of the drum, into said first annular chamber, a second passageway for conducting lighter liquid from said second annular chamber, into the initial mixing chamber at said first end of the drum, a third passageway for conducting decanted lighter liquid into said third annular chamber from the final decantation chamber at said second end of the drum, a fourth passageway for conducting heavier liquid from said fourth annular chamber into the initial mixing chamber at said second end of the drum, pipe means for introducing lighter liquid into, and withdrawing the same from said third and second annular chambers, respectively, and pipe means for introducing heavier liquid into and withdrawing the same from said first and fourth annular chambers, respectively, all said pipe means extending into and along said drum, centrally, from the same end thereof.

10. The apparatus of claim 1, said drum including an end wall secured to and over one end thereof and having a re-entrant hollow hub, a hollow base fixed at said one end of the drum, a cylindrical shell having one end fixed to said base in liquid-tight relation therewith, and surrounding said drum in radially-spaced relation therewith, a cover plate fixed to and obturating the other end of said cylindrical shell, a first pipe passing through said cover plate coaxially of said axis and terminating within said drum, for conveying lighter liquid thereinto, a baffle means formed as a surface of revolution about said axis and surrounding said hub in spaced relation therewith to form with said hub a space for guiding lighter liquid along said axis, and a power-driven shaft passing through an opening in said base and journaled therein coaxial with said axis, said shaft having one end fixed to said hub, centrally thereof.

11. The apparatus of claim 10, said space at its end adjacent said end wall, being in communication with the radial inner ends of said radial passageway means of the plate immediately adjacent said end wall of the drum.

12. The apparatus of claim 11, a tube fixed at one end to said cover plate and extending into said drum coaxially of said axis, there being a circular row of holes in and through the end of said tube within said drum and opening into the mixing chamber nearest said cover plate, a frustoconical baffle element positioned within said tube, coaxially of said axis, and having its smaller end secured to the inner surface of said cover plate and its larger end secured to said tube to form with said tube a gathering chamber for directing heavier liquid into and through said holes, and a second pipe fixed within an opening in said cover plate and radially offset from said first pipe, to conduct heavier liquid from a source exteriorly of said apparatus, into said gathering chamber.

13. The apparatus of claim 12, an annular cap fixed to and obturating the other end of said drum and encircling said tube externally thereof, the inner peripheral edge of said cap being hollowed to define an inwardly facing circumferential channel coaxial of said axis, a hollow ring secured to said cover plate and having a peripheral flange extending loosely into the circumferential channel of said cap, a third pipe fixed within an opening in said cover plate and having its inner end terminating within said circumferential channel, for conducting decanted lighter liquid to the exterior of said apparatus, said circumferential channel being in direct communication with the decantation chamber nearest said annular cap.

14. The apparatus of claim 13, a cylindrical skirt secured at one edge to the rim of said cover plate and extending inwardly over and having its other inwardly-flanged end secured to and about said cylindrical shell to form a collecting space for lighter liquid emerging from said circumferential channel, about said hollow ring, and a pipe fitting in the wall of said skirt to conduct decanted lighter liquid from said collecting space, to the exterior of said apparatus.

15. The apparatus of claim 14, said hollow ring including a nozzle extending into said circumferential channel and in a plane normal to said axis, said nozzle being inclined in said plane at an angle to the radius from said axis, and in a direction opposite to the direction of rotation of the drum.

16. The apparatus of claim 1, each said wall means comprising a partition comprising a planar annular portion having its outer peripheral edge flanged in one direction and its inner peripheral edge flanged in the opposite direction to terminate in circular edges of greater and lesser diameters, respectively, said edge of greater diameter being in liquid-tight contact with the surface of one said plate, said edge of lesser diameter being in liquid-tight contact with the facing surface of the next adjacent plate, said second aperture means comprising a first circular row of circumferentially-spaced apertures coaxially of said axis, in and through the planar annular portion of said partition, said first row of apertures being in substantial registration with the vanes of the contiguous mixer blade.

17. The apparatus of claim 16 said second aperture means also including a second circular row of circumferentially spaced apertures coaxially of said axis, adjacent and outside said first row.

18. The apparatus of claim 16, said conduit forming means comprising a series of openings in and through the rim of each said plate and a plurality of frustoconical wall members each coaxial of said axis and interposed between a respective pair of consecutive plates, in liquid tight contact therewith, the edge of lesser radius lying just inside the rim openings in one plate and directing liquid from the decantation chamber at one side of said plate, into the radial passageway means of the next adjacent plate leading into the mixing chamber at the other side of said one plate.

19. The apparatus of claim 1, each said wall means comprising a cylindrical wall having one edge fixed liquid tight with the surface of its respective plate, coaxial of said axis, and its other edge inwardly flanged toward said axis, there being a circumferential row of spaced apertures in and through said wall for passage of mixed liquids therethrough into the decantation chamber conjointly defined by said surface and the confronting surface of the next adjacent plate.

20. The apparatus of claim 19, each said mixing blade having a circular set of spaced vanes fixed to its periphery and axially offset from its surface confronting the corresponding plate.

21. The apparatus of claim 20, each said plate having a second circular row of spaced vanes inside, contiguous to, and essentially coplanar with the circular set of spaced vanes upon the corresponding mixing blade, there being a circular row of holes in and through each said plate, radially inward of and adjacent said circular row of vanes, said rows of vanes and holes being coaxial about said axis.

22. The apparatus of claim 1, said drum having a first closed end and a shaft extending from said closed end coaxially of said axis and exteriorly of the drum, a base, bearing means carried by said base, bearing means carried by said base and spaced along said shaft for journaling the shaft and drum for rotation about said axis, said mounting means for said blades comprising a hollow shaft fixed with said base and extending through an opening in the second end of said drum, and power means connected with said shaft for rotating the drum.

23. The apparatus of claim 22, a floor, first and second bearings, means mounting said bearings in aligned spaced relation fixed with said floor at one side thereof, coaxial of said axis, said shaft depending through a hole in said floor, said drum having a closed end centrally fixed to the depending end of said shaft, said means mounting said mixing blades comprising a hollow shaft, and a bracket secured to one side of said floor and fixedly mounting said hollow shaft to depend through the other end of and into said drum, coaxial of said axis.

24. The apparatus of claim 1, said wall means comprising a cylindrical wall fixed at one edge to its plate, coaxially of said axis, and having an inwardly-extending flange integral with its other edge, said cylindrical wall being spaced inwardly from the peripheral wall of the drum, said second aperture means comprising a row of circumferentially-spaced apertures in and through said cylindrical wall, each said mixing blade having impeller vanes fixed with its periphery.

25. The method of sequentially mixing and decanting in a plurality of stages, two normally immiscible liquids of different density, comprising, rotating about a common axis a plurality of stages each comprising a first decantation chamber, a second gathering chamber, and a third mixing chamber, all annular and coaxial of said axis and arranged in the order mentioned, while passing lighter liquid in streams parallel with and radially spaced from said axis, from said first chamber directly through said second chamber into said third chamber, simultaneously passing heavier liquid into said second chamber in inwardly-directed streams substantially radial of said axis, to intercept and mingle with the streams of lighter liquid passing therethrough, and mixing the liquids in said third chamber.

26. The method of claim 25, and passing mixed liquids from said third chamber, in streams parallel with and spaced from said axis, into the first chamber of the next succeeding stage.

27. The method of claim 26, directing heavier liquid decanted in one first chamber, in streams flowing in one direction along and spaced a first radial distance from said axis, into the second chamber of the next adjacent stage in said one direction, while directing lighter liquid decanted in said one first chamber, in the other direction along said axis and in streams flowing into the mixing chamber of the stage next adjacent in said other direction and spaced from said axis a second radial distance less than said first radial distance.

28. The method of claim 27, introducing lighter liquid into and exhausting heavier decanted liquid from the terminal stage at one end, and exhausting decanted lighter liquid from and introducing heavier liquid into the terminal stage at the other end.

References Cited

UNITED STATES PATENTS

| | | | |
|---|---|---|---|
| 2,036,924 | 4/1936 | Coutor | 233—15 |
| 2,234,921 | 3/1941 | Webb. | |
| 2,622,796 | 12/1952 | Steinacker et al. | 233—15 |
| 2,715,994 | 8/1955 | Steinacker | 233—15 |

HENRY T. KLINKSIEK, *Primary Examiner.*

U.S. Cl. X.R.

233—18